US009626157B2

(12) United States Patent
Cheung et al.

(10) Patent No.: US 9,626,157 B2
(45) Date of Patent: Apr. 18, 2017

(54) METHOD OF PROJECTING A WORKSPACE AND SYSTEM USING THE SAME

(71) Applicant: ABLE WORLD INTERNATIONAL LIMITED, Virgin Islands, British (VG)

(72) Inventors: Wai-Tung Cheung, Tuen Mun (HK); Chun-Hsiao Lin, New Taipei (TW); Shih-Cheng Lan, Taipei (TW); Ho-Cheung Cheung, Central (HK)

(73) Assignee: ABLE WORLD INTERNATIONAL LIMITED, Tortola (VG)

( * ) Notice: Subject to any disclaimer, the term of this patent is extended or adjusted under 35 U.S.C. 154(b) by 100 days.

(21) Appl. No.: 14/577,772

(22) Filed: Dec. 19, 2014

(65) Prior Publication Data

US 2016/0004512 A1 Jan. 7, 2016

Related U.S. Application Data

(63) Continuation-in-part of application No. 14/324,069, filed on Jul. 3, 2014, now Pat. No. 9,134,963.

(51) Int. Cl.
G06F 9/44 (2006.01)

(52) U.S. Cl.
CPC . *G06F 8/20* (2013.01); *G06F 8/35* (2013.01)

(58) Field of Classification Search
CPC .................................. G06F 8/20; G06F 8/35
USPC .......................................... 717/100, 104, 105
See application file for complete search history.

(56) References Cited

U.S. PATENT DOCUMENTS

| 6,437,803 | B1* | 8/2002 | Panasyuk | G06F 9/4443 715/733 |
| 2004/0243980 | A1 | 12/2004 | Das | |
| 2005/0120349 | A1* | 6/2005 | Wright | G06F 9/4443 718/102 |
| 2005/0151835 | A1* | 7/2005 | Guo | G06F 3/1454 348/14.08 |
| 2007/0055941 | A1* | 3/2007 | Bhakta | G06F 3/1454 715/739 |

(Continued)

FOREIGN PATENT DOCUMENTS

| CN | 1525312 A | 9/2004 |
| CN | 101814028 A | 8/2010 |

(Continued)

*Primary Examiner* — Qing Chen
(74) *Attorney, Agent, or Firm* — WPAT, PC; Justin King; Siying Chen

(57) ABSTRACT

A method of projecting a workspace includes the following steps. Firstly, a projectable space instance which is instantiated from a unified script is provided through a URI (uniform resource identifier). The unified script is defined to configure at least one of an matterizer, information and tool to model a workspace. The projectable space instance is used for building a projected workspace corresponding to the workspace so as to provide an interface for operating at least one of the matterizer, the information and the tool to perform a task. Then, a projector is used to parse the projectable space instance and build a working environment to configure at least one of the matterizer, the information and the tool. Consequently, the projected workspace is executed for providing interaction between at least one user and the projected workspace.

25 Claims, 16 Drawing Sheets

(56) References Cited

U.S. PATENT DOCUMENTS

| | | | | |
|---|---|---|---|---|
| 2007/0113066 A1* | 5/2007 | Samba | ...................... | G06F 8/61 |
| | | | | 713/1 |
| 2007/0124374 A1* | 5/2007 | Arun | ...................... | G06Q 10/10 |
| | | | | 709/204 |
| 2009/0006553 A1* | 1/2009 | Grandhi | .............. | G06F 17/3023 |
| | | | | 709/205 |
| 2010/0312542 A1 | 12/2010 | Van Wyk et al. | | |
| 2010/0313199 A1* | 12/2010 | Chen | .................... | G06F 9/5055 |
| | | | | 717/177 |
| 2011/0197147 A1* | 8/2011 | Fai | ........................ | G06F 1/1639 |
| | | | | 715/753 |
| 2012/0054640 A1* | 3/2012 | Nancke-Krogh | ..... | G06F 9/4843 |
| | | | | 715/751 |
| 2012/0060204 A1* | 3/2012 | Panasyuk | ................ | G06F 21/31 |
| | | | | 726/3 |
| 2012/0151373 A1* | 6/2012 | Kominac | .......... | G06F 17/30905 |
| | | | | 715/740 |
| 2013/0246901 A1 | 9/2013 | Massand | | |

FOREIGN PATENT DOCUMENTS

| | | |
|---|---|---|
| CN | 102333114 A | 1/2012 |
| CN | 102929638 A | 2/2013 |
| CN | 103092980 A | 5/2013 |
| CN | 103188567 A | 7/2013 |
| CN | 103428525 A | 12/2013 |
| CN | 103460670 A | 12/2013 |
| CN | 103631598 A | 3/2014 |
| CN | 103731483 A | 4/2014 |
| KR | 20120086035 | 8/2012 |
| KR | 20140021091 A | 2/2014 |
| TW | 201329734 A | 7/2013 |

\* cited by examiner

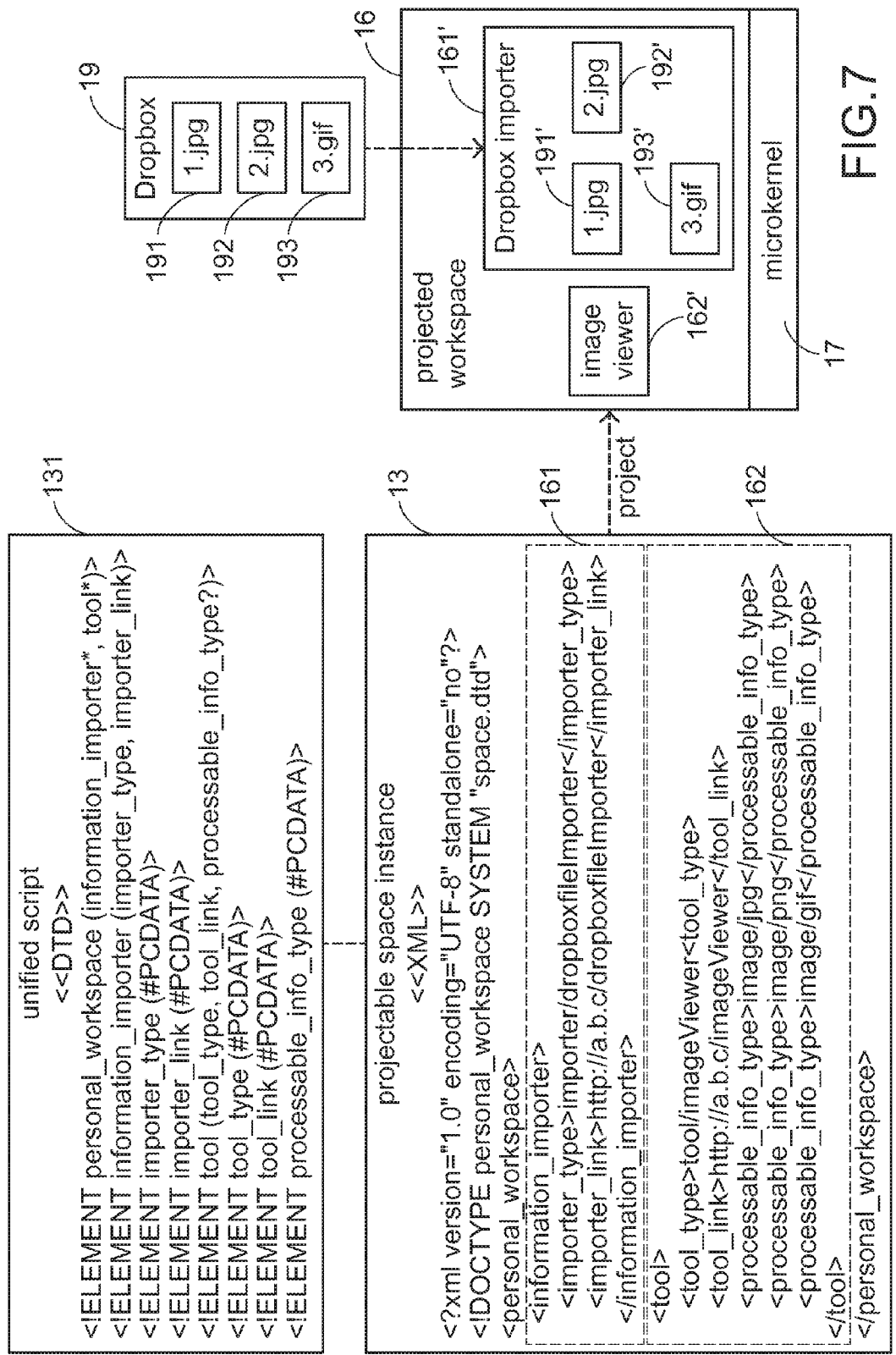

METHOD OF PROJECTING A WORKSPACE AND SYSTEM USING THE SAME

CROSS-REFERENCE TO RELATED APPLICATIONS

This application is a continuous-in-part application claiming priority benefit from U.S. application Ser. No. 14/324,069, filed on 3 Jul. 2014, and entitled "A METHOD OF UNIFYING INFORMATION AND TOOL FROM A PLURALITY OF INFORMATION SOURCES".

FIELD OF THE INVENTION

The present invention relates to a projecting method, and more particularly to a projecting method for projecting a workspace and a system using the same.

BACKGROUND OF THE INVENTION

In today's convenience daily life, people are accustomed to use an electronic device with computational capability to achieve various kinds of applications. For example, these applications include working, file processing, entertainment, social communication, and so on. With development of science and technology, knowledge can be propagated more quickly. Accordingly, various web platforms, operating systems and software tools have been developed for people to use, and brought more efficient lives to the users. However, some inconvenient and perplexing problems below occur.

Firstly, a large number of information and tools in the same or different formats are distributed in different information sources. It is difficult for people to integrate the information contents and the tools that are obtained in a single workspace and have different formats because the information contents and the tools in different formats are usually incompatible.

Secondly, various kinds of webpage platforms, operating systems and software are almost developed by different developers, and usually independent from and incompatible with each other. Consequently, while a task is performed, it is unable to operate specified functions of different webpage platforms, operating systems and software through a single user interface. For example, when a user intends to use a first function of Photoshop software and a second function of Photoimpact software to edit a first photo, the user has to open a user interface of the Photoshop software to perform the first function and open a user interface of the Photoimpact software to perform the second function. In other words, it is inconvenient to the user.

Thirdly, since different users have different habits and different purposes of manipulating the electronic devices, the working environments suitable for the users are only created in their often-used electronic devices (such as home desktop computers). Once a user leaves a location of the often-used electronic device, the user can only access information that is stored in the often-used electronic device through another electronic device via internet. Since the working environment of another electronic device is not frequently operated by the user, the second electronic device does not provide the often-used application tool or the specified function. Unless the required application tool or the specified function is installed in another electronic device, the user cannot perform a task.

From the above discussions, it is necessary to provide a workspace for allowing various information contents and tools in different webpage platforms, operating systems and software to be compatible with each other in order to implement a specified task. Moreover, it is an important issue to provide a transmittable workspace to be manipulated in any electronic device (such as a mobile phone) by the user at any time and in every place, or even to be manipulated in any other electronic devices by other users at any time and in every place.

SUMMARY OF THE INVENTION

The present invention provides a method for allowing a workspace to be projected into any electronic device with computational capabilities, so as to make any user to manipulate the workspace in any electronic device with computational capabilities.

In accordance with an aspect of the present invention, there is provided a method for projecting a workspace. The method includes the following steps. Firstly, acquiring a projectable space instance which is instantiated from a unified script through a URI (uniform resource identifier), wherein the unified script is defined to configure at least one of an matterizer, an information and tool to model a workspace, and the projectable space instance is used for building a projected workspace corresponding to the workspace so as to provide an interface for operating at least one of the matterizer, the information and the tool to perform a task. Then, a projector is used to parse the projectable space instance and build a working environment to configure the at least one of the matterizer, the information and the tool, so as to execute the projected workspace for providing interaction between at least one user and the projected workspace.

In an embodiment, the at least one of the matterizer, the information and the tool is allowed to be added in or removed from the projectable space instance.

In an embodiment, the projectable space instance is accessible to an authorized user or an authorized machine.

In an embodiment, the method of projecting the workspace further includes a step of acquiring the projector and loading the projector into an engine. The engine provides a compatible environment for executing the projector.

In an embodiment, the engine includes at least a JavaScript engine, a Windows application, or a Linux application.

In an embodiment, the projector is loaded from a remote site, the projectable space instance or a preinstalled application.

In an embodiment, at least one of the matterizer, the information and the tool is executable in the projected workspace.

In an embodiment, the URI includes at least a HTTP (hypertext transfer protocol) URI, a FTP (file transfer protocol) URI, or a local file URI.

In an embodiment, the working environment includes a microkernel provided by the projector, wherein the microkernel equips at least one of the matterizer, the information or the tool.

In an embodiment, the unified script is declared by a unified script, a DTD (Document Type Definition), a XML (extensible markup language) Schema, a structured language or a structured protocol.

In an embodiment, the projectable space instance is an object, an XML document, or an instance which is instantiated with a structured language or a structured protocol.

In an embodiment, the matterizer imports the information and/or the tool into the projected workspace.

In an embodiment, the information is a unified information unit which is produced after original information obtained from at least one information source is unified. The tool is a unified tool which is produced after an original tool obtained from at least one information source is unified.

In an embodiment, the information includes a file, a web page, a database row, a policy, a rule or any information accessible from a corresponding machine or a server. The tool includes a utility, a widget, an agent, an application, a service or any executable element accessible from a corresponding machine or a server.

In accordance with an aspect of the present invention, there is provided a method for projecting a workspace. The method includes the following steps. Firstly, a projectable space instance which is saved in a first machine is loaded into a second machine, wherein the projectable space instance is instantiated from a unified script, and the unified script is defined to configure at least one of a matterizer, an information or a tool to model a workspace. Then, a projector of the second machine is used to parse the projectable space instance, so as to project the workspace into the second machine, and the workspace is executed in a working environment that is built by the projector.

In an embodiment, the at least one of the matterizer, the information and the tool is allowed to be added in or removed from the projectable space instance.

In an embodiment, the method of projecting the workspace further comprises a step of acquiring the projector and loading the projector into an engine of the second machine, wherein the engine provides a compatible environment for executing the projector.

In an embodiment, the engine includes at least a JavaScript engine, a Windows application, or a Linux application.

In an embodiment, the projector is loaded from a remote site, the projectable space instance or a preinstalled application.

In an embodiment, at least one of the matterizer, the information and the tool is executable in the projected workspace.

In an embodiment, the method of projecting the workspace further includes a step of loading the projectable space instance which is saved in the first machine into the second machine through a URI.

In an embodiment, the URI includes at least a HTTP (hypertext transfer protocol) URI, a FTP (file transfer protocol) URI, or a local file URI.

In an embodiment, the working environment includes a microkernel provided by the projector, wherein the microkernel equips at least one of the matterizer, the information or the tool.

In an embodiment, the unified script is declared by a unified script, a DTD (Document Type Definition), a XML Schema, a structured language or a structured protocol.

In an embodiment, the projectable space instance is an object, an XML document, or an instance which is instantiated with a structured language or a structured protocol.

In an embodiment, the matterizer imports the information and/or the tool into the projected workspace.

In an embodiment, the information is a unified information unit which is produced after original information obtained from at least one information source is unified. The tool is a unified tool which is produced after an original tool obtained from at least one information source is unified.

In an embodiment, the information includes a file, a web page, a database row, a policy, a rule or any information accessible from a corresponding machine or a server. The tool includes a utility, a widget, an agent, an application, a service or any executable element accessible from a corresponding machine or a server.

In accordance with an aspect of the present invention, there is provided a system. The system includes a first machine and a second machine. The first machine includes a projectable space instance which is instantiated from a unified script. The unified script is defined to configure at least one of a matterizer, information or a tool to model a workspace. The second machine loads the projectable space instance of the first machine into the second machine. The second machine includes a projector for parsing the projectable space instance so as to project the workspace into the second machine. The projected workspace is executed in a working environment that is built by the projector.

The above objects and advantages of the present invention will become more readily apparent to those ordinarily skilled in the art after reviewing the following detailed description and accompanying drawings, in which.

BRIEF DESCRIPTION OF THE DRAWINGS

FIG. 7 is a schematic diagram showing the relationship between a projectable space instance as shown in FIG. 5 and a projected workspace as shown in FIG. 6B.

DETAILED DESCRIPTION OF THE PREFERRED EMBODIMENT

The present invention is more fully appreciated by reference to the following description, including the following glossary of terms and the concluding examples. For the sake of brevity, the disclosures of the publications, including patents, cited in this specification are herein incorporated by reference.

The embodiments mentioned below only express some kinds of aspects and features of the present invention and the present invention should not be limited thereto. The term "information source" used herein is defined as a sequence of symbols that can interpreted as a message in the most limited technical meaning. And the message is used for organizing and labeling information. The information source includes website (such as internet service), intranet, social network, software, electronic book, database and other media of information (such as storage media of non-transitory computer or storage media of mobile device). The term "original information" used herein is defined as file, web page, database row, policy, rule or any information accessible from corresponding machine or server, but is not limited thereto. The term "original tool" used herein is defined as utility program, widget, software agent, application, service or any executable element accessible from corresponding machine or server, but is not limited thereto.

Further, the "original information" and the "original tool" are embodiments of the "original matter" in the present invention. In accordance with the present invention, a plurality of "original matters" from identical or different "information sources" are modeled to a plurality of "unified matters" by a unifying method. Moreover, the "unified tool" and the "unified information unit" are embodiments of the "unified matter" in the present invention. And the term "matterizer" described herein is a component, a device or a program code for unifying the "original matter".

In a preferred embodiment, the above unifying method includes steps of: modeling at least one original information obtained from at least one information source of multiple information sources into a unified information unit with one unified data model via re-organizing the original information, and/or modeling at least one original tool obtained from at least one information source of multiple information sources into a unified tool with another unified data model via re-organizing the original tool. The one unified data model and another unified data model could be the same or different, and the unifying method described above could be completed through a matterizer.

Figure 1:
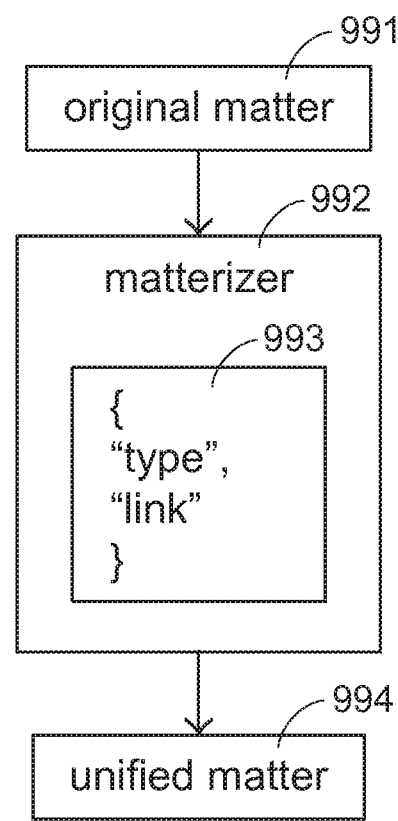
FIG. 1 is a schematic diagram showing an implementation concept of a unifying method according to an embodiment.

Please refer to FIG. 1. FIG. 1 is a schematic diagram showing an implementation concept of a unifying method according to an embodiment of the present invention. As shown in FIG. 1, a matterizer 992 re-organizing an attribute and an associated link of an original matter 991 with a unified data model 993, so as to model the original matter 991 into a unified matter 994. Thus the basic attributes of the unified matter 994 include a type of the original matter 991 and a link indicating where the original matter 991 is located.

In this embodiment, the original matter 991 at least includes original information (not shown in figs) or an original tool (not shown in figs), but is not limited thereto. In the above unifying method, if the attributes accessible from the original information correspond to the attributes to be unified in the unified information unit, the unified information unit is directly produced through the matterizer 992. If the attributes accessible from the original information do not correspond to the attributes to be unified in the unified information unit, the original information is firstly re-defined by logically re-organizing the attributes and the link of the original information, and then the original information is converted into a new original information with the attributes which correspond to attributes to be unified in the unified information unit. Thus the unified information unit is indirectly produced.

Further, the unified tool is directly produced through the matterizer 992 if the original tool is compatible with the working environment of the workspace. And the unified tool is indirectly produced via an adapter and/or a software development kit (SDK) of the original tool when the original tool is incompatible with the working environment of the workspace. Besides, the adapter provides an interface implementation compatible with the working environment.

Herein, "the descriptions of the unifying method", "the methods of obtaining the unified matters" and "the descriptions of the matterizer" may be referred to the U.S. patent application Ser. No. 14/324,069, entitled "A method of unifying information and tool from a plurality of information sources", and also referred to the China Patent Application No. 201410768564.X, which claims the benefit of priority to the U.S. patent application Ser. No. 14/324,069 and is entitled "A method of unifying information and tool from a plurality of information sources and computer product and device using the method". The detailed descriptions thereof are omitted.

The above unifying method is presented herein for purpose of illustration and description only. The method of unifying a plurality of original matters from different information sources is not restricted. However, those skilled in the art will readily observe that numerous modifications and alterations may be made while retaining the teachings of the invention.

Hereinafter, two other unifying methods will be illustrated. The first unifying method is applied to a method of unifying the information of Garmin satellite navigation. Through a point-of-interest (POI) function of the Garmin satellite navigation, the method of unifying the information is employed to unify the imported original point information (i.e., an original information) into the corresponding unified point information (i.e., a unified information unit). The second unifying method is applied to a method of unifying the tool of an Android system. The Android system is a Linux-based open source mobile operating system. However, most application programs (i.e., original tools) are written in the Java programming language. Consequently, the application program (i.e., the original tool) written in the Java programming language can be modeled into a unified application program (i.e., the unified tool) compatible with the Android system so as to be executed in the Android system.

Figure 2:
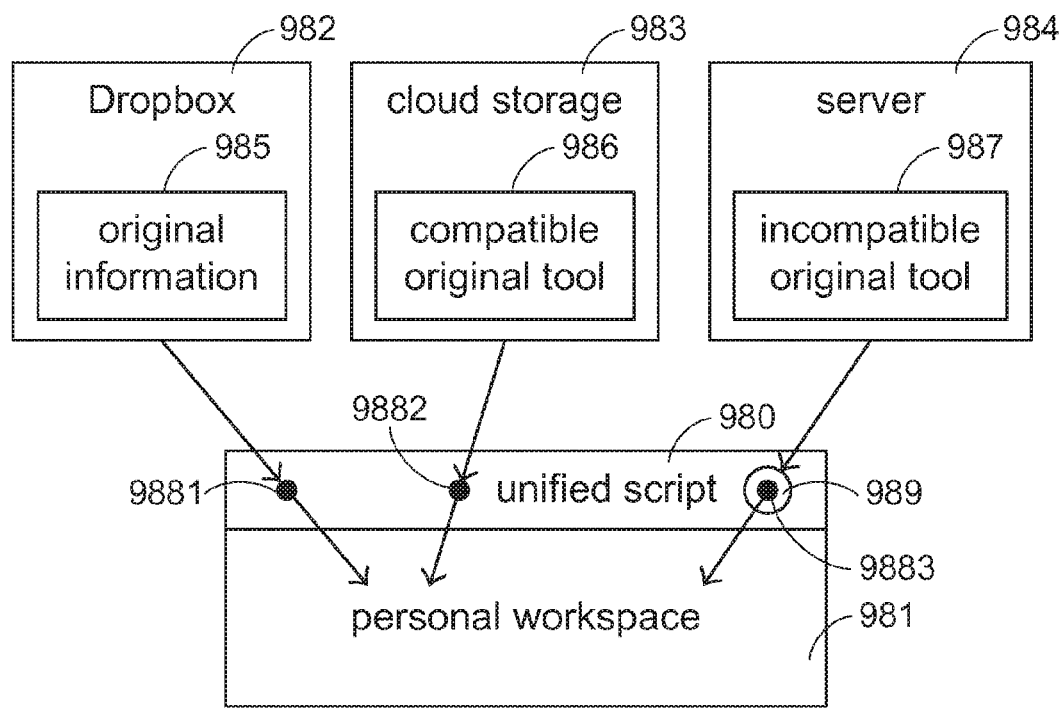
FIG. 2 is a schematic diagram showing an implementation concept of using the unified script as an intermediate language for implementing the workspace.

Moreover, the term "workspace" described herein is a working environment for processing interactions among the at least one matterizer, the at least one information and/or the at least one tool so as to execute a specified task. And the at least one information and/or at least one tool is imported into the workspace through the at least one matterizer, but is not limited thereto. Still, the information importers mentioned below, such as information importers 9881, 9882 and 9883 of FIG. 2, are examples of the matterizer. The unified script described herein is an intermediate language for implementing the workspace. Moreover, via the "unified script", the at least one matterizer, the at least one tool and/or the at least one information can be provided to the workspace (e.g., built in or plugged in the workspace).

In an embodiment, the above at least one information is a unified information unit which is produced after at least one original information obtained from at least one information source is unified, and the at least one tool is a unified tool which is produced after at least one original tool obtained from at least one information source is unified. Moreover, according to different tasks, the required unified information unit and/or the required unified tool from the corresponding information source can be added to the personal workspace (e.g., built in or plugged in the personal workspace). In other words, the "workspace" is a user-orientated "personal workspace".

Figure 3:
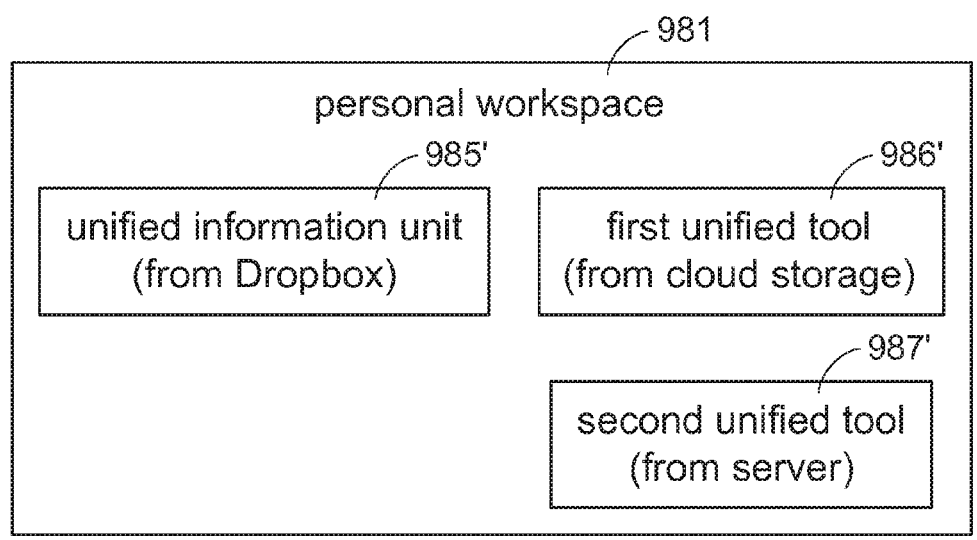
FIG. 3 is a schematic diagram showing a preferred configuration of a personal workspace.

Furthermore, please refer to FIG. 2 and FIG. 3. FIG. 2 is a schematic diagram showing an implementation concept of using the unified script as an intermediate language for implementing the workspace. FIG. 3 is a schematic diagram showing a preferred configuration of a personal workspace. As shown in FIG. 2 and FIG. 3, a unified information unit 985' corresponding to an original information 985 in the Dropbox 982, a first unified tool 986' corresponding to a compatible original tool 986 in the cloud storage 983 and a second unified tool 987' corresponding to an incompatible original tool 987 in a server 984 are combined together into a personal workspace 981 according to the required tasks. In particular, a unified script 980 as an intermediate language in the personal workspace 981 is firstly compiled, and then an information importer 9881 of the Dropbox 982, an information importer 9882 of the cloud storage 983 and an information importer 9883 of the server 984 are configured through the unified script 980. Moreover, after the original information 985 in the Dropbox 982 is unified into the unified information unit 985' by the information importer 9881, the unified information unit 985' is imported into the personal workspace 981.

As shown in FIG. 2 and FIG. 3, the original tool saved in the cloud storage 983 is a compatible original tool 986, which is compatible with the component architecture of the unified tool of the personal workspace 981. And the first unified tool 986' corresponding to the compatible original tool 986 is directly provided to the personal workspace 981 through the information importer 9882 of the unified script 980.

Please refer to FIG. 2 and FIG. 3 again. The original tool saved in the server 984 is the incompatible original tool 987', which is incompatible with the component architecture of the unified tool of the personal workspace 981. Moreover, the second unified tool 987' corresponding to the incompatible original tool 987 is indirectly provided to the personal workspace 981 through a compatible adaptor 989 and the information importer 9883 of the unified script 980.

Besides, as shown in FIG. 3, the user can configure and arrange (such as group or place) the unified information unit 985', the first unified tool 986' and the second unified tool 987' in a specified region of the personal workspace 981 according to practical needs. Moreover, according to the operational relationship between the unified tool and the unified information unit (e.g., the clicking or dragging actions between the two), the user can perform specified tasks by using the unified tool to access or control the corresponding unified information unit.

Herein, "the descriptions of using the unified script as the intermediate language for implementing the personal workspace" and "the descriptions of allowing the required unified information unit and/or the required unified tool from the corresponding information sources to be arbitrarily combined together into the personal workspace according to the practical requirements" may be referred to the U.S. patent application Ser. No. 14/325,466, entitled "Method for performing task on unified information units in a personal workspace", and also referred to the China Patent Application No. 201410796528.4, which claims the benefit of priority to the U.S. patent application Ser. Nos. 14/324,069 and 14/325,466 and is entitled "A method of combining unified matters in a personal workspace and computer product and device using the method". The detailed descriptions thereof are omitted.

The above personal workspace is presented herein for purpose of illustration and description only. It is noted that the workspace used in the present invention is not restricted. For example, the unified script as the intermediate language for implementing the workspace can be previously edited. Consequently, the workspace has the default matterizer, the default information and/or the default tool. This workspace is not limited to be operated by a single user. According to the practical requirements, this workspace can be operated by multiple users at the same time or at different times.

Next, the method of providing a transmittable workspace to be operated in any electronic device by any user will be described as follows.

Figure 4:
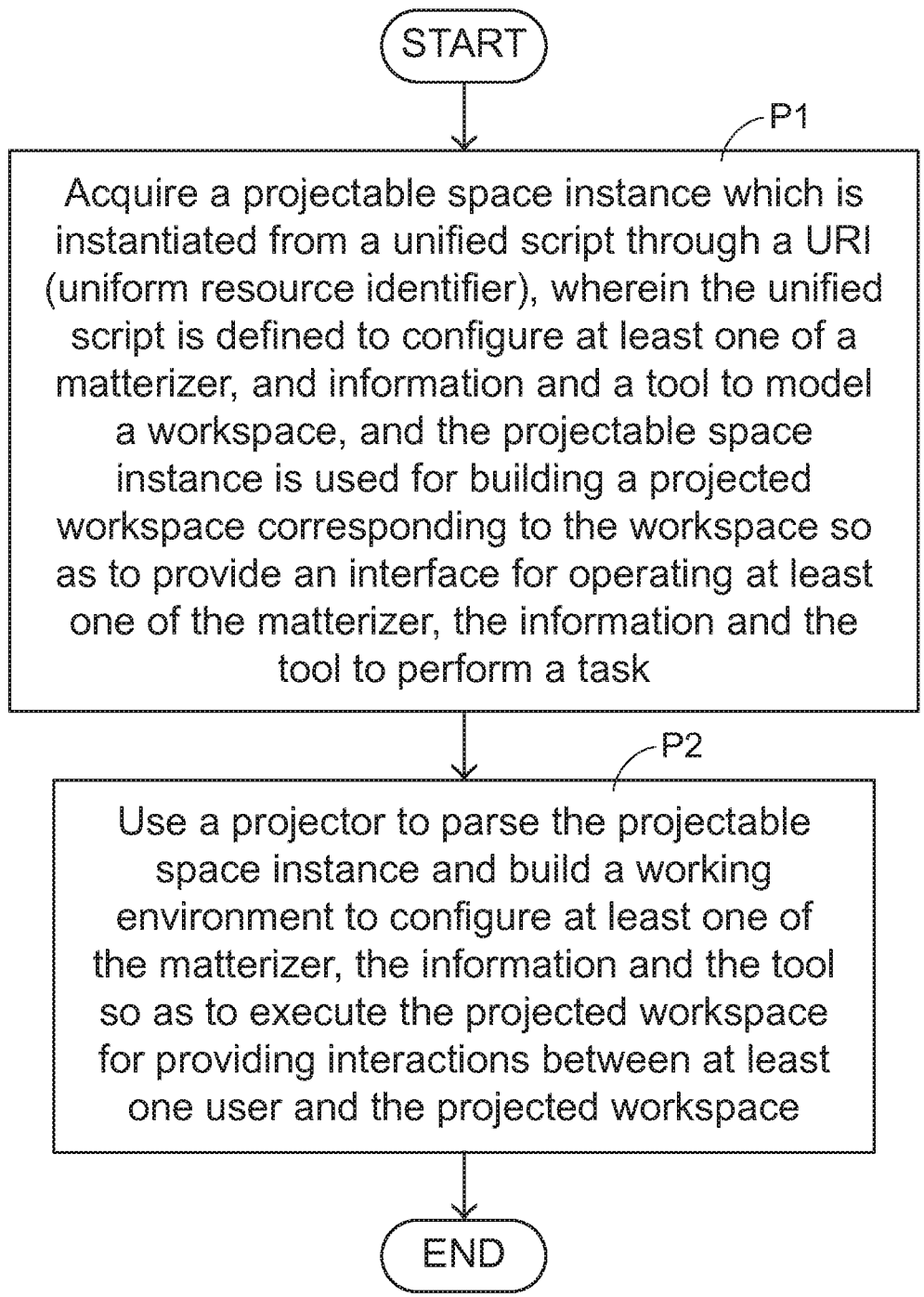
FIG. 4 is a flowchart illustrating a method of projecting a workspace according to an embodiment of the present invention.

Please refer to FIG. 4. FIG. 4 is a flowchart illustrating a method of projecting a workspace according to an embodiment of the present invention. The method of projecting the workspace includes the following steps:

Step P1: Acquire a projectable space instance which is instantiated from a unified script through a URI (uniform resource identifier), wherein the unified script is defined to configure at least one of a matterizer, and information and a tool to model a workspace, and the projectable space instance is used for building a projected workspace corresponding to the workspace so as to provide an interface for operating at least one of the matterizer, the information and the tool to perform a task; and Step P2: Use a projector to parse the projectable space instance and build a working environment to configure at least one of the matterizer, the information and the tool so as to execute the projected workspace for providing interactions between at least one user and the projected workspace.

Preferably but not exclusively, the united script can be declared by a document type definition (DTD), an extensible markup language (XML) Schema, a structured language or a structured protocol. The projectable space instance is an object, an extensible markup language (XML) document, or an instance instantiated with a structured language or a structured protocol.

Figure 5:
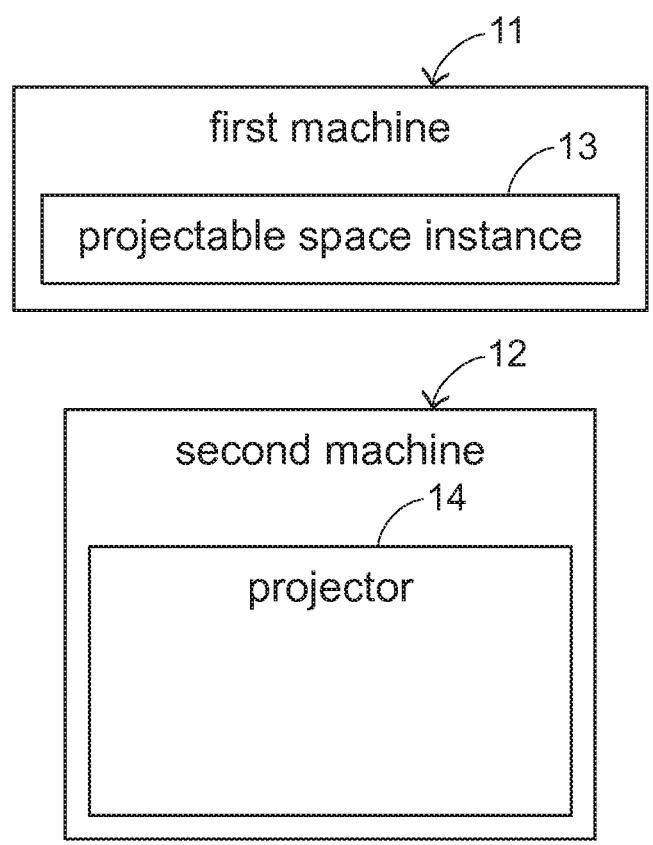
FIG. 5 is a schematic diagram showing an initial state of the method of projecting the workspace according to a first embodiment of the present invention.
Figure 6A:
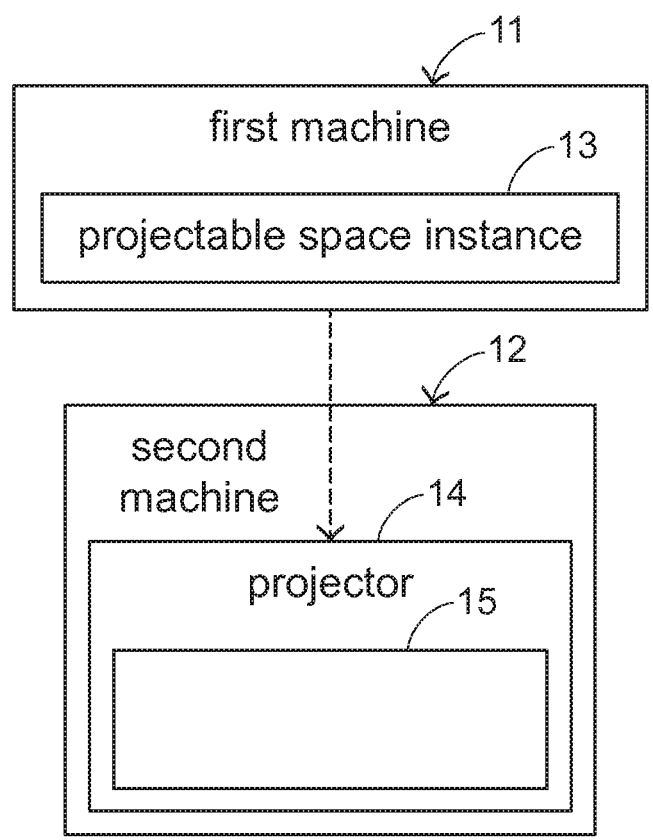
FIG. 6A is a schematic diagram showing operating concepts of the method of projecting the workspace as shown in FIG. 5.
Figure 6B:
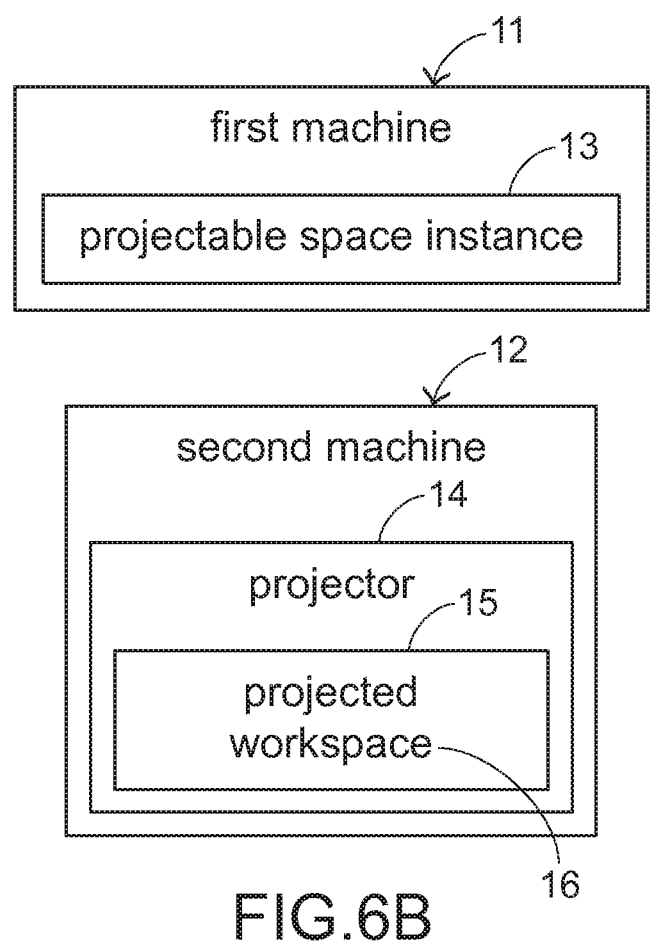
FIG. 6B is a schematic diagram showing operating concepts of the method of projecting the workspace as shown in FIG. 5.

Furthermore, the method of projecting the workspace as shown in FIG. 1 will be illustrated in more details in following three embodiments. Please refer to FIG. 5, FIG. 6A, FIG. 6B and FIG. 7. FIG. 5 is a schematic diagram showing an initial state of the method of projecting the workspace according to a first embodiment of the present invention. FIG. 6A and FIG. 6B are schematic diagrams showing operating concepts of the method of projecting the workspace as shown in FIG. 5. FIG. 7 is a schematic diagram showing the relationship between a projectable space instance as shown in FIG. 5 and a projected workspace as shown in FIG. 6B. In the initial state of FIG. 5, a first machine 11 and a second machine 12 are in communication with each other (e.g., through network connection). Furthermore, the first machine 11 stores a projectable space instance 13, and the second machine 12 has a built-in projector 14.

In this embodiment, a unified script 131 is declared by the DTD (Document Type Definition) and defined for configuring at least one information importer, at least one unified information and/or at least one unified tool to model the workspace. And the information importer is an example of the matterizer. Moreover, the projectable space instance 13 is an object which is instantiated with the extensible markup language (XML). As shown in FIG. 7, the projectable space instance 13 is used for building the projected workspace 16 corresponding to the workspace. Besides, the information importer, the unified information and/or the unified tool is allowed to be added in or removed from the projectable space instance 13. The above-mentioned descriptions will be illustrated in more details as follows.

Furthermore, the projector 14 of the second machine 12 will build a working environment 15 on the second machine 12 for executing the projected workspace 16, and the projector 14 provides a microkernel 17 (see FIG. 7) to the working environment 15 for equipping at least one information importer, at least one unified information and/or at least one unified tool that will be added to the projected workspace 16. When the second machine 12 acquires the projectable space instance 13 from the first machine 11 through a URI, the projector 14 of the second machine 12 starts to parse the projectable space instance 13 (see FIG. 6A). After the projectable space instance 13 is parsed by the projector 14, the projected workspace 16 is created in the working environment 15 according to parsed contents of the projectable space instance 13 (see FIG. 7B). Accordingly, a user of the second machine 12 can interact with the projected workspace 16 through the second machine 12 so as to perform related tasks.

The relationships among the unified script 131, the projectable space instance 13 and the projected workspace 16 will be illustrated in more details through a usage situation as shown in FIG. 7. The usage situation as shown in FIG. 7 is related to a process of building a projected workspace that is capable of accessing jpg format image files and gif format image files from a specified internet space and allowing the image files to be viewed by a user. In this usage situation, a unified script 131 is declared by the Document Type Definition (DTD), and the projectable space instance 13 is instantiated with XML.

Moreover, the information importer and the unified tool are added into the projectable space instance 13, and at least one unified information unit corresponding to original information is imported into the projected workspace 16 though the information importer. In this usage situation, the information importer is a Dropbox importer. The information of the Dropbox importer is disclosed in the dashed line frame 161 of FIG. 7. The original information includes a jpg format image file 191, a jpg format image file 192 and a gif format image file 193 in Dropbox 19 (i.e., an information source). The unified information units include a unified jpg format image file 191', a unified jpg format image file 192' and a unified gif format image file 193', which will be described later. Besides, the unified tool is an image viewer for accessing the image files which are imported into the projected workspace 16. The information of the unified tool is disclosed in the dashed line frame 162 of FIG. 7.

As mentioned above, the projected workspace 16 is created after the projectable space instance 13 is parsed by the projector 14 of the second machine 12. In this embodiment, the Dropbox importer 161' corresponding to the dashed line frame 161 and the image viewer 162' corresponding to the dashed line frame 162 are configured in the projected workspace 16. Also, the jpg format image file 191, the jpg format image file 192 and the gif format image file 193 in Dropbox 19 are unified and imported into the projected workspace 6 by the Dropbox importer 161'. Consequently, the unified jpg format image file 191' corresponding to the jpg format image file 191, the unified jpg format image file 192' corresponding to the jpg format image file 192 and the unified gif format image file 193' corresponding to the gif format image file 193 are displayed in the projected workspace 16. When the user of the second machine 12 manipulates any of the unified image files 191', 192' and 193' by any specified means (such as an action of clicking on any of the unified images files 191', 192' and 193', or an action of dragging and dropping any of the image files 191', 192' and 193' to the image viewer 162'), the image viewer 162' will access the contents of the corresponding unified image files 191', 192' or 193' to present the unified image files 191', 192' or 193' to the user. Besides, the information importer 161' and the image viewer 162' mentioned above are equipped by the microkernel 17.

It is noted that the URI of the projectable space instance 13 may be a HTTP (hypertext transfer protocol) URI or a FTP (file transfer protocol) URI. When the first machine 11 and the second machine 12 are integrated into one device, the URI of the projectable space instance 13 can also be a local file URI. However, the URI of the projectable space instance 13 is not limited to above-mentioned types. Besides, the projectable space instance 13 can not only be accessed by an original editor but also accessed by an authorized user or an authorized machine. For instance, the authorized user can acquire the projectable space instance 13 through the URI by using an authorized user account and a password.

Figure 8:
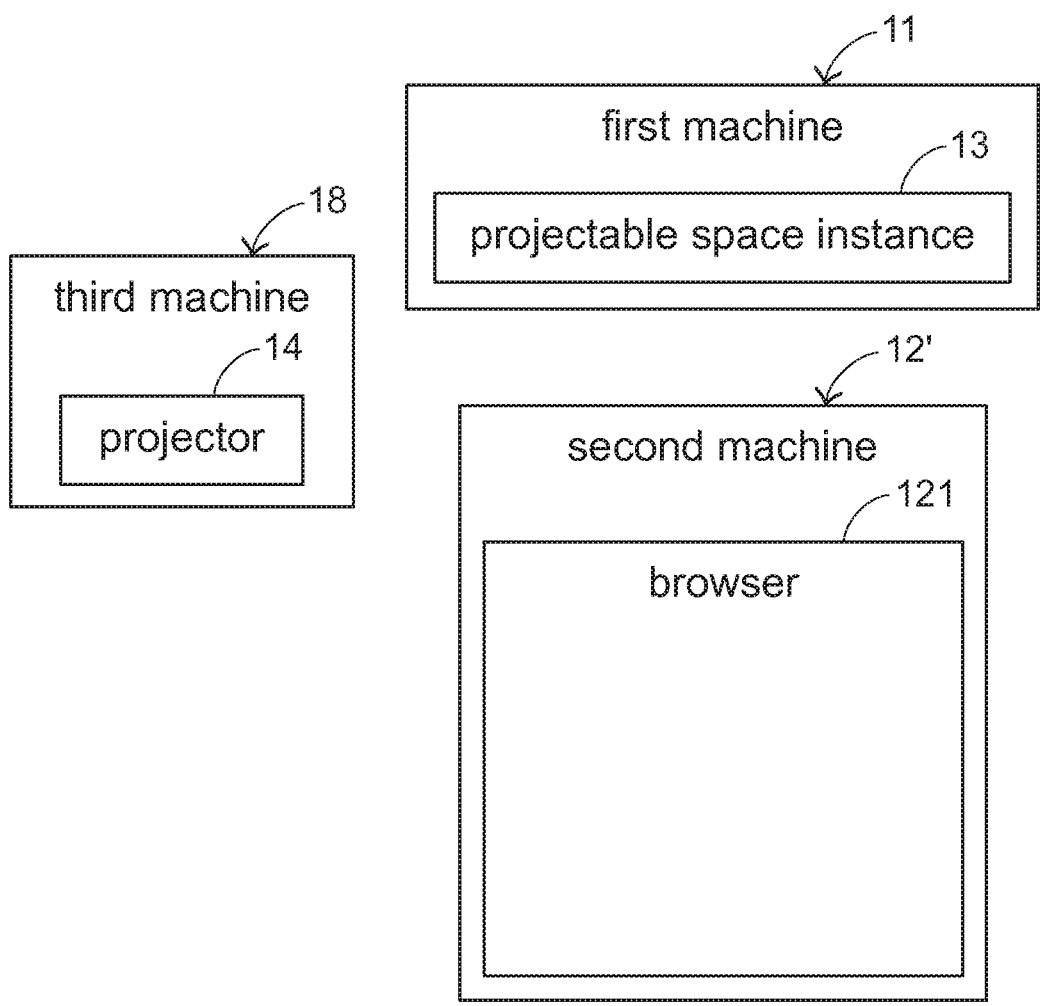
FIG. 8 is a schematic diagram showing an initial state of the method of projecting the workspace according to a second embodiment of the present invention.
Figure 9A:
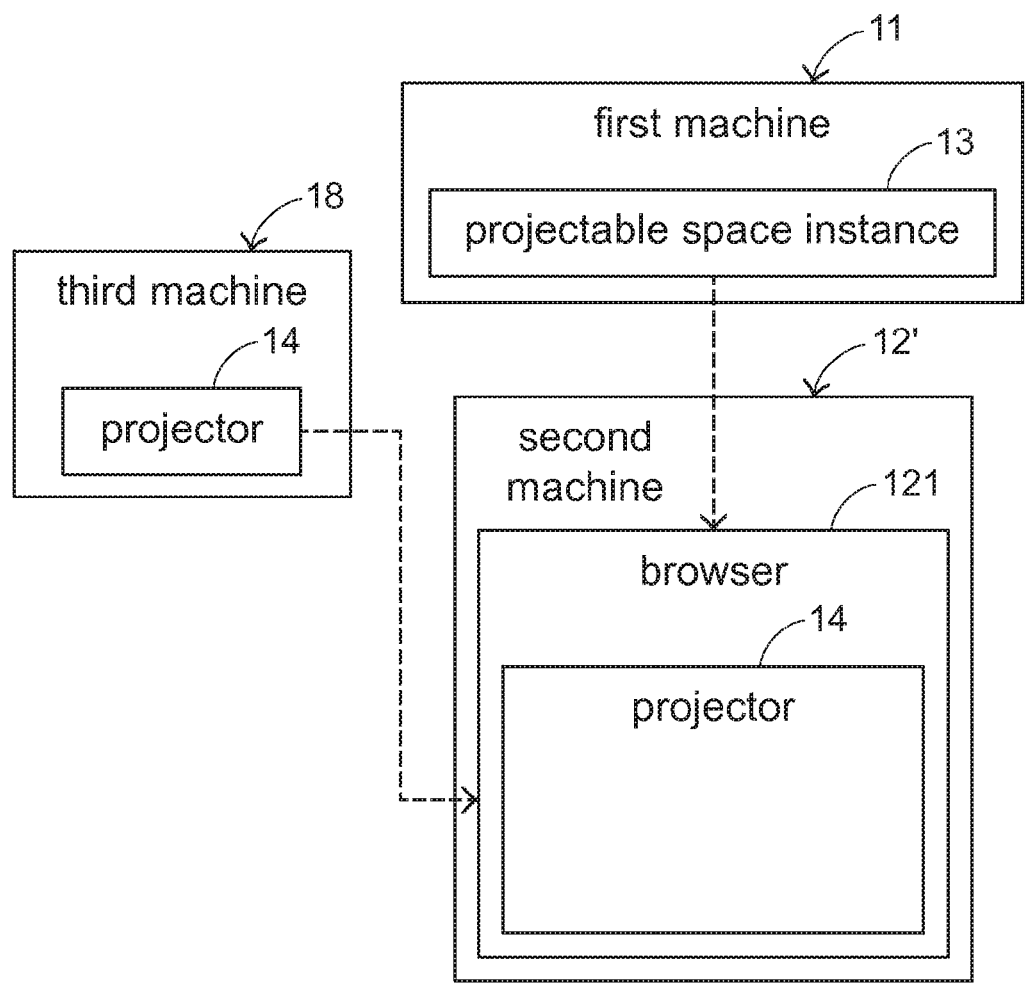
FIG. 9A is a schematic diagram showing operating concepts of the method of projecting the workspace as shown in FIG. 8.
Figure 9B:
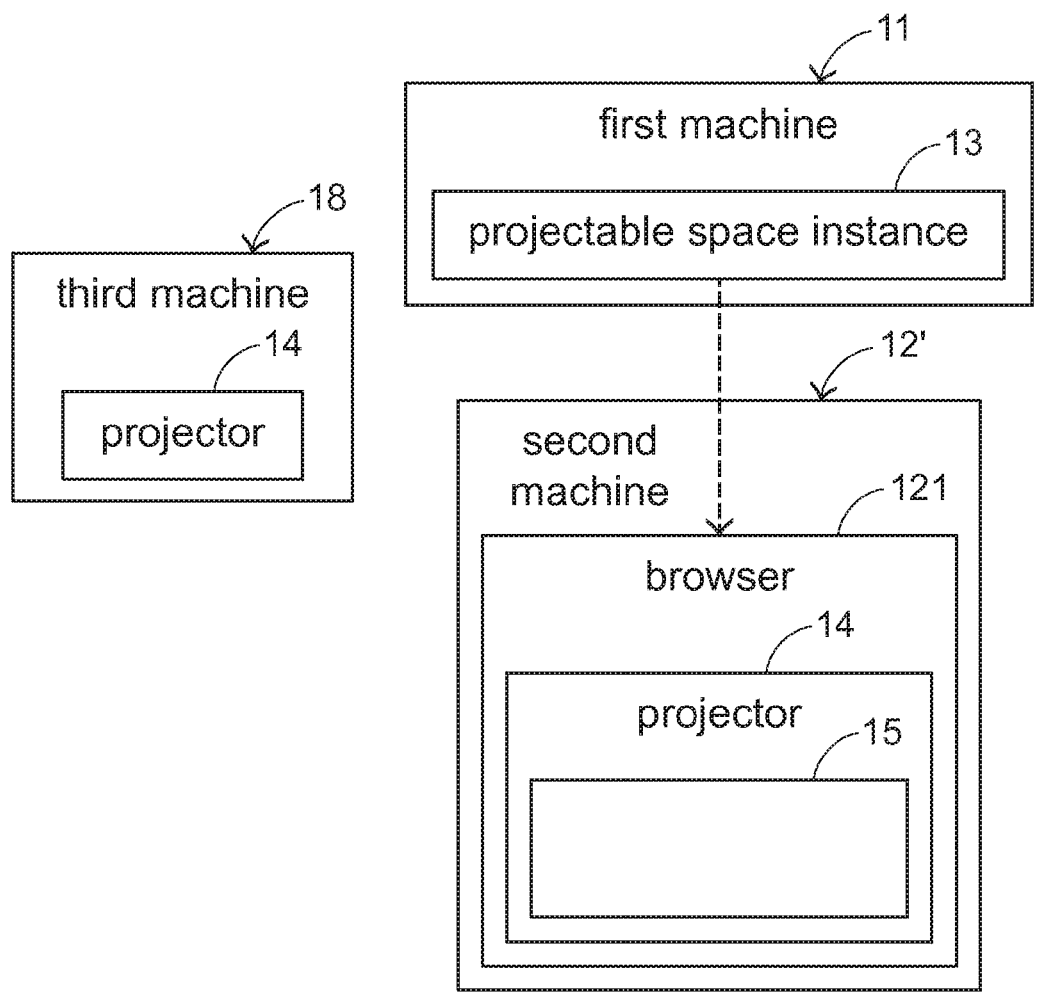
FIG. 9B is a schematic diagram showing operating concepts of the method of projecting the workspace as shown in FIG. 8.
Figure 9C:
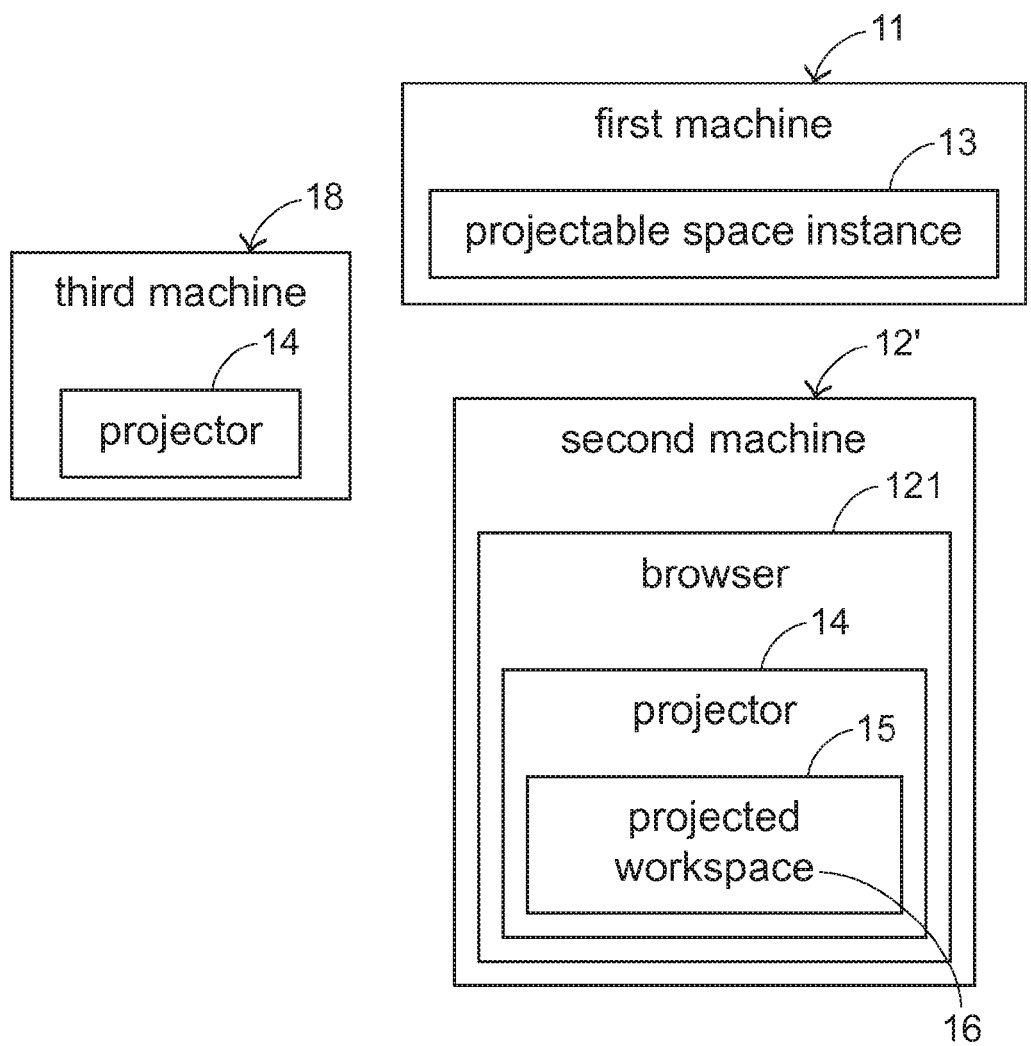
FIG. 9C is a schematic diagram showing operating concepts of the method of projecting the workspace as shown in FIG. 8.

Please refer to FIG. 8, FIG. 9A, FIG. 9B and FIG. 9C. FIG. 8 is a schematic diagram showing an initial state of the method of projecting the workspace according to a second embodiment of the present invention. FIG. 9A, FIG. 9B and FIG. 9C are schematic diagrams showing operating concepts of the method of projecting the workspace as shown in FIG. 8. The descriptions of this embodiment are similar to the first embodiment and therefore not redundantly described herein. In comparison with the first embodiment, the initial state as shown in FIG. 8 also includes a third machine 18. The third machine 18 and a second machine 12' are in communication with each other (e.g., through network connection). In addition, the second machine 12' further includes a browser 121 but does not have the projector 14.

Moreover, the browser 121 is an engine which provides a compatible environment for executing the projector 14. An example of the engine includes but is not limited to a JavaScript engine. Furthermore, the third machine 18 is a remote site, and the projector 14 is saved in the third machine 18. In this embodiment, the browser 121 of the second machine 12' firstly loads the projector 14 through a URI of the projector 14 at first (see FIG. 9A). Then, the projector 14 starts to build the working environment 15 on the browser 121 for executing the projected workspace 16, and the projector 14 provides the microkernel 17 to the working environment 15. As described in the first preferred embodiment, when the projector 14 acquires the projectable space instance 13 from the first machine 11, the projector 14 starts to parse the projectable space instance 13 (see FIG. 9B). Also, after the projectable space instance 13 is parsed by the projector 14, the projected workspace 16 is created in the working environment 15 according to parsed contents of the projectable space instance 13 (see FIG. 9C). Accordingly, a user of the second machine 12' can interact with the projected workspace 16 through the second machine 12' so as to perform related tasks.

Figure 10:
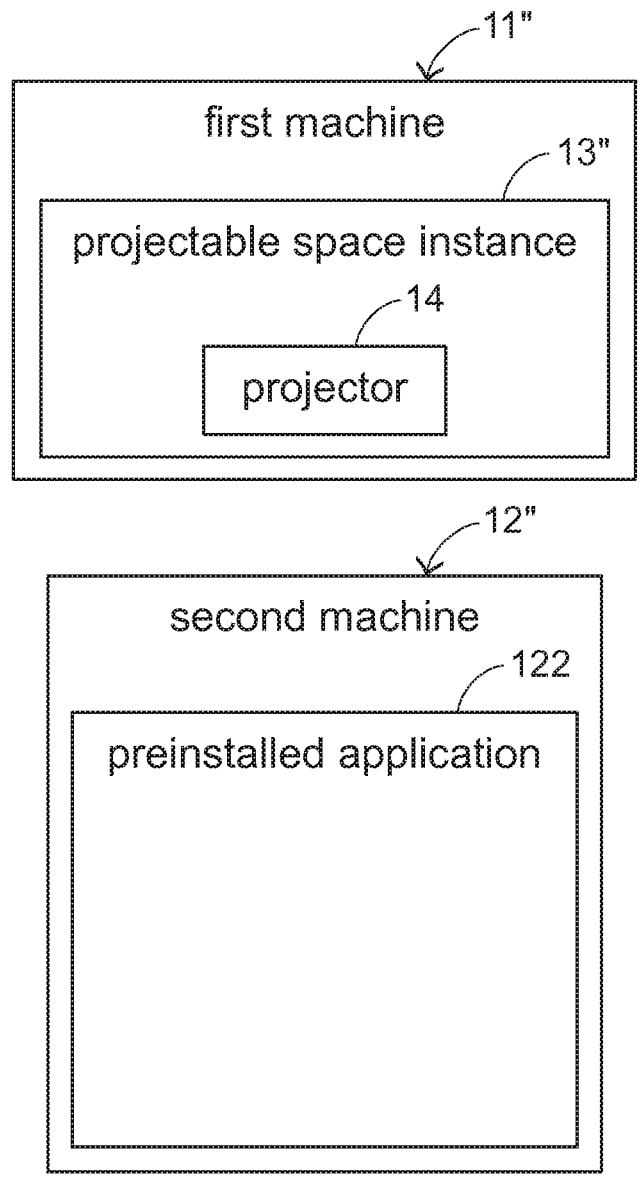
FIG. 10 is a schematic diagram showing an initial state of the method of projecting the workspace according to a third embodiment of the present invention.
Figure 11A:
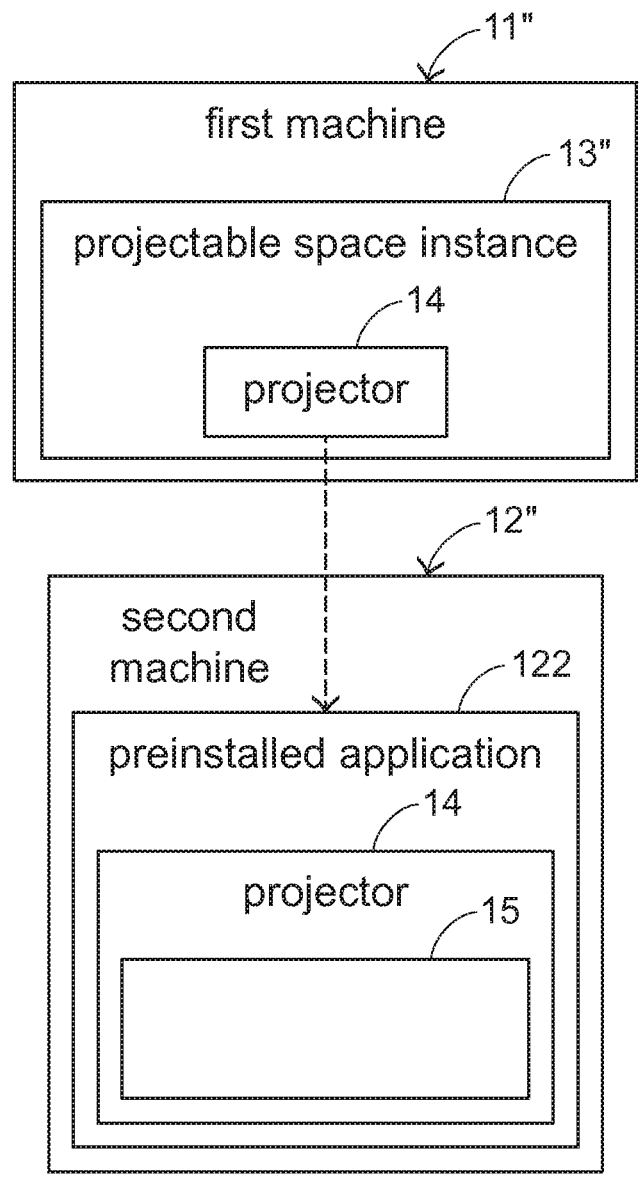
FIG. 11A is a schematic diagram showing operating concepts of the method of projecting the workspace as shown in FIG. 10.
Figure 11B:
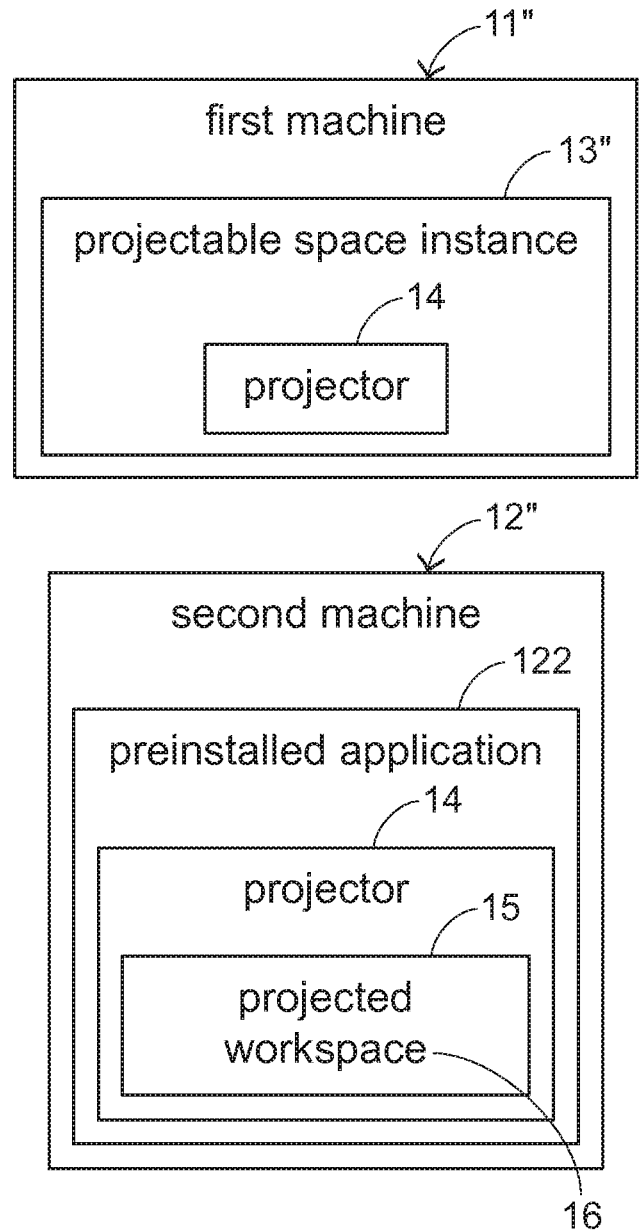
FIG. 11B is a schematic diagram showing operating concepts of the method of projecting the workspace as shown in FIG. 10.

Please refer to FIG. 10, FIG. 11A and FIG. 11B. FIG. 10 is a schematic diagram showing an initial state of the method of projecting the workspace according to a third embodiment of the present invention. FIG. 11A and FIG. 11B are schematic diagrams showing operating concepts of the method of projecting the workspace as shown in FIG. 10. The descriptions of this embodiment which are similar to the above-mentioned first and second preferred embodiments are not redundantly described herein. In comparison with the above-mentioned first and second preferred embodiments, the projector 14 is configured in the projectable space instance 13" of a first machine 11". Besides, a preinstalled application 122 is saved in a second machine 12". The preinstalled application 122 is a program, an engine or an agent. For instance, the preinstalled application 122 is an interpreter, a Windows application type engine, a Linux application type engine or an intelligent agent with capability of interaction, but is not limited thereto.

In this embodiment, when the preinstalled application 122 is opened, the preinstalled application 122 of the second machine 12" acquires the projectable space instance 13" from the first machine 11" through the URI. According to settings about the relationship between the projectable space instance 13" and the preinstalled application 122, the preinstalled application 122 has to load the projector 14 from the projectable space instance 13" into the preinstalled application 122 at first when acquiring the projectable space instance 13". Then, the projector 14 builds the working environment 15 in the second machine 12" for executing the projected workspace 16. Also, the projector 14 provides the microkernel 17 to the working environment 15. As described in the first and second preferred embodiments, when the projector 14 acquires the projectable space instance 13", the projector 14 starts to parse the projectable space instance 13" (see FIG. 11A). After the projectable space instance 13" is parsed by the projector 14, the projected workspace 16 is created in the working environment 15 according to parsed contents of the projectable space instance 13" (see FIG. 11B). Accordingly, a user of the second machine 12" can interact with the projected workspace 16 through the second machine 12" so as to perform related tasks.

Although the tools mentioned in the first to third embodiments are unified tools created after the original tools obtained from at least one information source are unified, the tool mentioned in the step P1 of the method shown in FIG. 4 is not limited to the unified tools described in the first to third embodiments. Further, although the information mentioned in the first to third embodiments are unified information units created after the original information obtained from at least one information source are unified, the information mentioned in the step P1 of the method shown in FIG. 4 is not limited to the unified information units described in the first to third embodiments.

Figure 12:
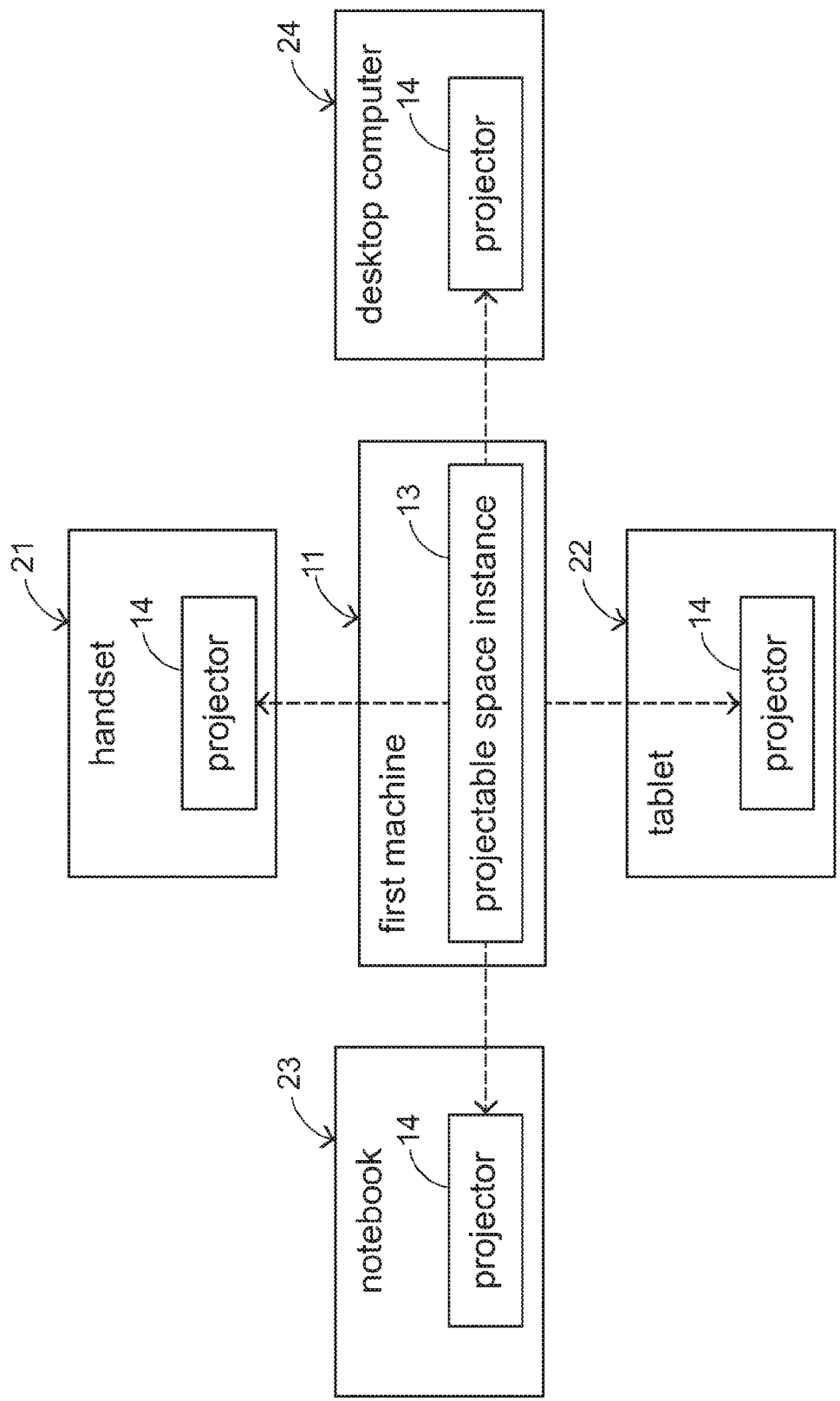
FIG. 12 is a schematic diagram showing concepts of transmitting the workspace to multiple electronic devices by using the method of projecting the workspace as shown in FIG. 4.

From the above descriptions, the present invention allows the workspace to be projected into any machine with computational capabilities. For instance, please refer to FIG. 12. FIG. 12 is a schematic diagram showing concepts of transmitting the workspace to multiple electronic devices by using the method of projecting the workspace as shown in FIG. 4. As shown in FIG. 12, each of multiple electronic devices (e.g., a handset 21, a tablet 22, a notebook 23 and a desktop computer 24) includes a projector 14. Consequently, these electronic devices can parse the projectable space instance 13 which is obtained from the first machine 11 so as to project the workspace to the handset 21, the tablet 22, the notebook 23 and the desktop computer 24. Hence, the workspace of present invention can be delivered. Once the handset 21, the tablet 22, the notebook 23, the desktop computer 24 or any other appropriate electronic device is available, the user can use the method of projecting workspace of the present invention to manipulate the workspace to perform tasks. After all, the present invention makes the workspace transmittable and possesses great industrial value.

Figure 13:
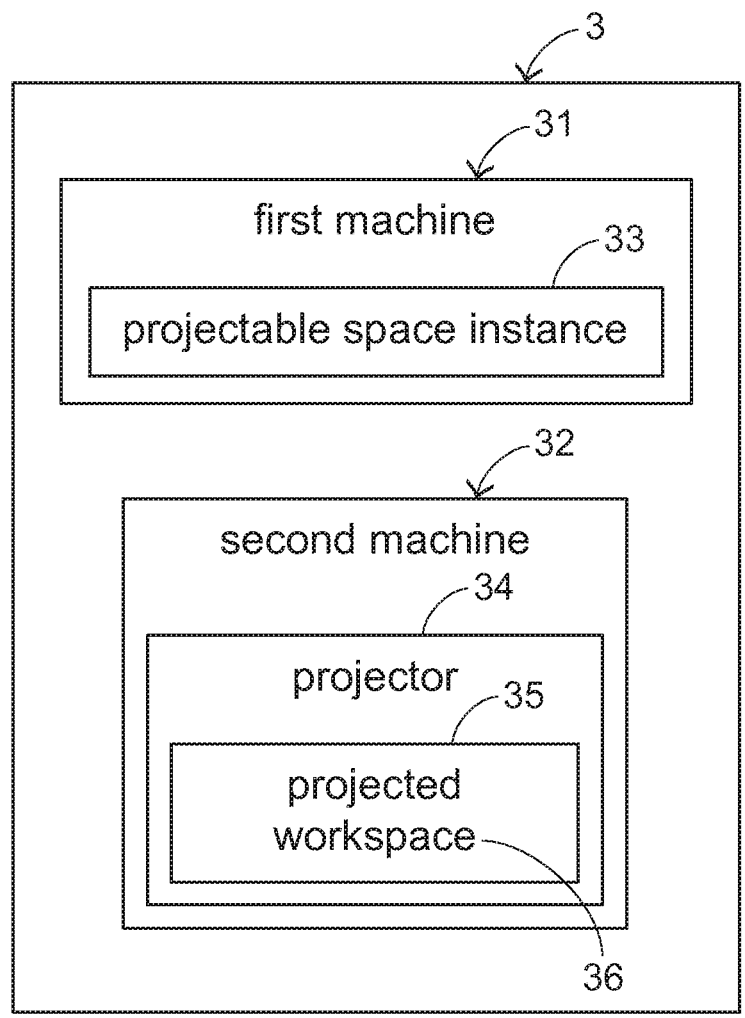
FIG. 13 is a block diagram showing a system using the method of FIG. 4 according to an embodiment of the present invention.

Please refer to FIG. 13. FIG. 13 is a block diagram showing a system using the method of FIG. 4 according to an embodiment of the present invention. As shown in FIG. 13, a system 3 includes a first machine 31 and a second machine 32. The first machine 31 includes a projectable space instance 33. The projectable space instance 33 is instantiated from a unified script (not shown), and the unified script is defined to configure at least one of a matterizer (not shown), information (not shown) and a tool (not shown) to model a workspace.

Besides, the second machine 32 can load the projectable space instance 33 of the first machine 31 into the second machine 32, and the second machine 32 includes a projector 34 for parsing the projectable space instance 33. After the projectable space instance 33 is parsed by the projector 34, the workspace is projected into the second machine 32. And the projected workspace 36 is executed in a working environment 35 that is built by the projector 34. Since "the method of instantiating the projectable space instance 33 from a unified script", "the method of loading the projectable space instance 33 of the first machine 31 into the second machine 32", "the method of obtaining the projector 34" and "the method of executing the projected workspace 36 in the second machine 32" have been described in above mentioned embodiments, the descriptions thereof are omitted herein.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method of projecting a workspace, comprising steps of:

acquiring a projectable space instance which is instantiated from a unified script for modeling a workspace through a URI (uniform resource identifier), wherein the unified script is defined to configure at least one of a matterizer, an information, and a tool to model the workspace; and using a projector to parse the projectable space instance for building a projected workspace corresponding to the modeled workspace, build a working environment for executing the projected workspace, and provide a microkernel in the working environment for equipping the matterizer, the information, and the tool in the projected workspace to perform a task in the projected workspace, wherein the matterizer imports the information and/or the tool into the projected workspace, the information is a unified information unit which is produced after original information obtained from at least one information source is unified, and the tool is a unified tool which is produced after an original tool obtained from at least one information source is unified, wherein the unified tool is directly provided to the projected workspace if the original tool is compatible with a component architecture of the unified tool of the projected workspace, and the unified tool is indirectly provided to the projected workspace through an adapter if the original tool is incompatible with the component architecture of the unified tool of the projected workspace, wherein the task includes receiving a user input command, executing the user input command, and presenting an executed result of the user input command in the projected workspace, thereby providing interaction between a user and the projected workspace, and wherein the projected workspace, the working environment, and the microkernel are executed in a same compatible environment for executing the projector.

2. The method of projecting the workspace according to claim 1, wherein the projectable space instance allows the at least one of the matterizer, the information, and the tool to be added in or removed from the projectable space instance.

3. The method of projecting the workspace according to claim 1, wherein the projectable space instance is accessible to an authorized user or an authorized machine.

4. The method of projecting the workspace according to claim 1, wherein the compatible environment for executing the projector, the projected workspace, the working environment, and the microkernel are provided by an engine where the projector is loaded.

5. The method of projecting the workspace according to claim 4, wherein the engine includes at least a JavaScript engine or a native application.

6. The method of projecting the workspace according to claim 4, wherein the projector is loaded from a remote site, the projectable space instance, or a preinstalled application.

7. The method of projecting the workspace according to claim 1, wherein the URI includes at least a HTTP (hypertext transfer protocol) URI, a FTP (file transfer protocol) URI, or a local file URI.

8. The method of projecting the workspace according to claim 1, wherein the unified script is declared by a DTD (Document Type Definition), a XML (extensible markup language) Schema, a structured language, or a structured protocol.

9. The method of projecting the workspace according to claim 1, wherein the projectable space instance is an object, an XML (extensible markup language) document, or an instance which is instantiated with structured language or structured protocol.

10. The method of projecting the workspace according to claim 1, wherein the information includes a file, a web page, a database row, a policy, a rule, or any information accessible from a corresponding machine or a server, and the tool includes a utility, a widget, an agent, an application, a service, or any executable element accessible from a corresponding machine or a server.

11. The method of projecting the workspace according to claim 1, wherein the task is performed in a same system process of the projected workspace.

12. A method of projecting a workspace, comprising steps of:

loading a projectable space instance which is saved in a first machine into a second machine in communication with the first machine via a network, wherein the projectable space instance is instantiated from a unified script for modeling a workspace, and the unified script is defined to configure at least one of a matterizer, an information, and a tool to model the workspace; and using a projector of the second machine to parse the projectable space instance and provide a microkernel so as to build a projected workspace corresponding to the modeled workspace and equip at least one of the matterizer, the information, and the tool in the projected workspace in the second machine, wherein the matterizer imports the information and/or the tool into the projected workspace, the information is a unified information unit which is produced after original information obtained from at least one information source is unified, and the tool is a unified tool which is produced after an original tool obtained from at least one information source is unified, wherein the unified tool is directly provided to the projected workspace if the original tool is compatible with a component architecture of the unified tool of the projected workspace, and the unified tool is indirectly provided to the projected workspace through an adapter if the original tool is incompatible with the component architecture of the unified tool of the projected workspace, wherein the projected workspace is executed in a working environment built by the projector to perform a task in the second machine, wherein the task includes receiving a user input command, executing the user input command, and presenting an executed result of the user input command in the projected workspace, thereby providing interaction between a user and the projected workspace, and wherein the projected workspace, the working environment, and the microkernel are executed in a same compatible environment for executing the projector.

13. The method of projecting the workspace according to claim 12, wherein the projectable space instance allows the at least one of the matterizer, the information, and the tool to be added in or removed from the projectable space instance.

14. The method of projecting the workspace according to claim 12, wherein the projector is loaded into an engine of the second machine, which provides a compatible environment for executing the projector.

15. The method of projecting the workspace according to claim 14, wherein the engine includes at least a JavaScript engine or a native application.

16. The method of projecting the workspace according to claim 14, wherein the projector is loaded from a remote site, the projectable space instance, or a preinstalled application.

17. The method of projecting the workspace according to claim 12, wherein at least one of the matterizer, the information, and the tool is executable in the projected workspace.

18. The method of projecting the workspace according to claim 12, wherein the projectable space instance which is saved in the first machine is located through a URI (uniform resource identifier).

19. The method of projecting the workspace according to claim 18, wherein the URI includes at least a HTTP (hypertext transfer protocol) URI, a FTP (file transfer protocol) URI, or a local file URI.

20. The method of projecting the workspace according to claim 12, wherein the unified script is declared by a DTD (Document Type Definition), a XML (extensible markup language) Schema, a structured language, or a structured protocol.

21. The method of projecting the workspace according to claim 12, wherein the projectable space instance is an object, an XML (extensible markup language) document, or an instance which is instantiated with structured language or structured protocol.

22. The method of projecting the workspace according to claim 12, wherein the information includes a file, a web page, a database row, a policy, a rule, or any information accessible from a corresponding machine or a server, and the tool includes a utility, a widget, an agent, an application, a service, or any executable element accessible from a corresponding machine or a server.

23. The method of projecting the workspace according to claim 12, wherein the task is performed in a same system process of the projected workspace.

24. A system of projecting a workspace, including:
 a first machine including a projectable space instance which is instantiated from a unified script for modeling a workspace, and the unified script is defined to configure at least one of a matterizer, an information, or a tool to model the workspace; and
 a second machine including a projector to parse the projectable space instance and provide a microkernel so as to build a projected workspace corresponding to the modeled workspace and equip at least one of the matterizer, the information, and the tool in the projected workspace in the second machine, wherein the projected workspace is executed in a working environment built by the projector to perform a task in the second machine,
 wherein the matterizer imports the information and/or the tool into the projected workspace, the information is a unified information unit which is produced after original information obtained from at least one information source is unified, and the tool is a unified tool which is produced after an original tool obtained from at least one information source is unified,
 wherein the unified tool is directly provided to the projected workspace if the original tool is compatible with a component architecture of the unified tool of the projected workspace, and the unified tool is indirectly provided to the projected workspace through an adapter if the original tool is incompatible with the component architecture of the unified tool of the projected workspace,
 wherein the task includes receiving a user input command, executing the user input command, and presenting an executed result of the user input command in the projected workspace, thereby providing interaction between a user and the projected workspace, and
 wherein the projected workspace, the working environment, and the microkernel are executed in a same compatible environment for executing the projector.

25. The system of projecting the workspace according to claim 24, wherein the task is performed in a same system process of the projected workspace.

\* \* \* \* \*